United States Patent [19]

Tsukamoto

[11] 4,038,820
[45] Aug. 2, 1977

[54] TWO-CYCLE ENGINE WAVE INTERFERENCE MUFFLER MEANS

[75] Inventor: Magohei Tsukamoto, Iwata, Japan

[73] Assignee: Yamaha, Hatsudoki Kabushiki Kaisha, Iwata, Japan

[21] Appl. No.: 534,082

[22] Filed: Dec. 18, 1974

[30] Foreign Application Priority Data

Dec. 25, 1973  Japan ................... 49-3768

[51] Int. Cl.² .............. F02B 27/02; F01N 1/06
[52] U.S. Cl. ................. 60/314; 181/33 L; 181/48
[58] Field of Search ........... 60/312, 314; 123/65 E; 181/33 E, 33 F, 33 L, 53, 57, 33 D, 44, 48, 59, 36 E

[56] References Cited

U.S. PATENT DOCUMENTS

| 1,601,884 | 10/1926 | Rylsky | 181/33 D |
| 2,075,265 | 3/1937 | Bourne | 181/48 |
| 2,109,995 | 3/1938 | Hawle | 181/59 |
| 3,568,791 | 3/1971 | Luxton | 181/44 |
| 3,665,712 | 5/1972 | Tenney | 60/314 |
| 3,744,589 | 7/1973 | Mellin | 181/59 X |
| 3,776,364 | 12/1973 | Van Doeren | 181/48 |
| 3,842,599 | 10/1974 | Ehlen | 60/312 X |
| 3,875,744 | 4/1975 | Brooks et al. | 60/314 X |

FOREIGN PATENT DOCUMENTS

| 1,121,410 | 7/1962 | Germany | 123/65 E |

*Primary Examiner*—Carlton R. Croyle
*Assistant Examiner*—Thomas I. Ross
*Attorney, Agent, or Firm*—Donald D. Mon

[57] ABSTRACT

Exhaust means for internal combustion engines which comprises an exhaust pipe having one end connected with exhaust port of the engine, said exhaust pipe having an enlarged expansion chamber adjacent to the other end thereof, said exhaust pipe being closed at the other end and provided with an exhaust gas outlet port which is located at a position where the maximum value of noise producing pulsating pressure is relatively low, there being a first portion of substantially uniform cross-section connecting the engine to the enlarged expansion chamber.

7 Claims, 4 Drawing Figures

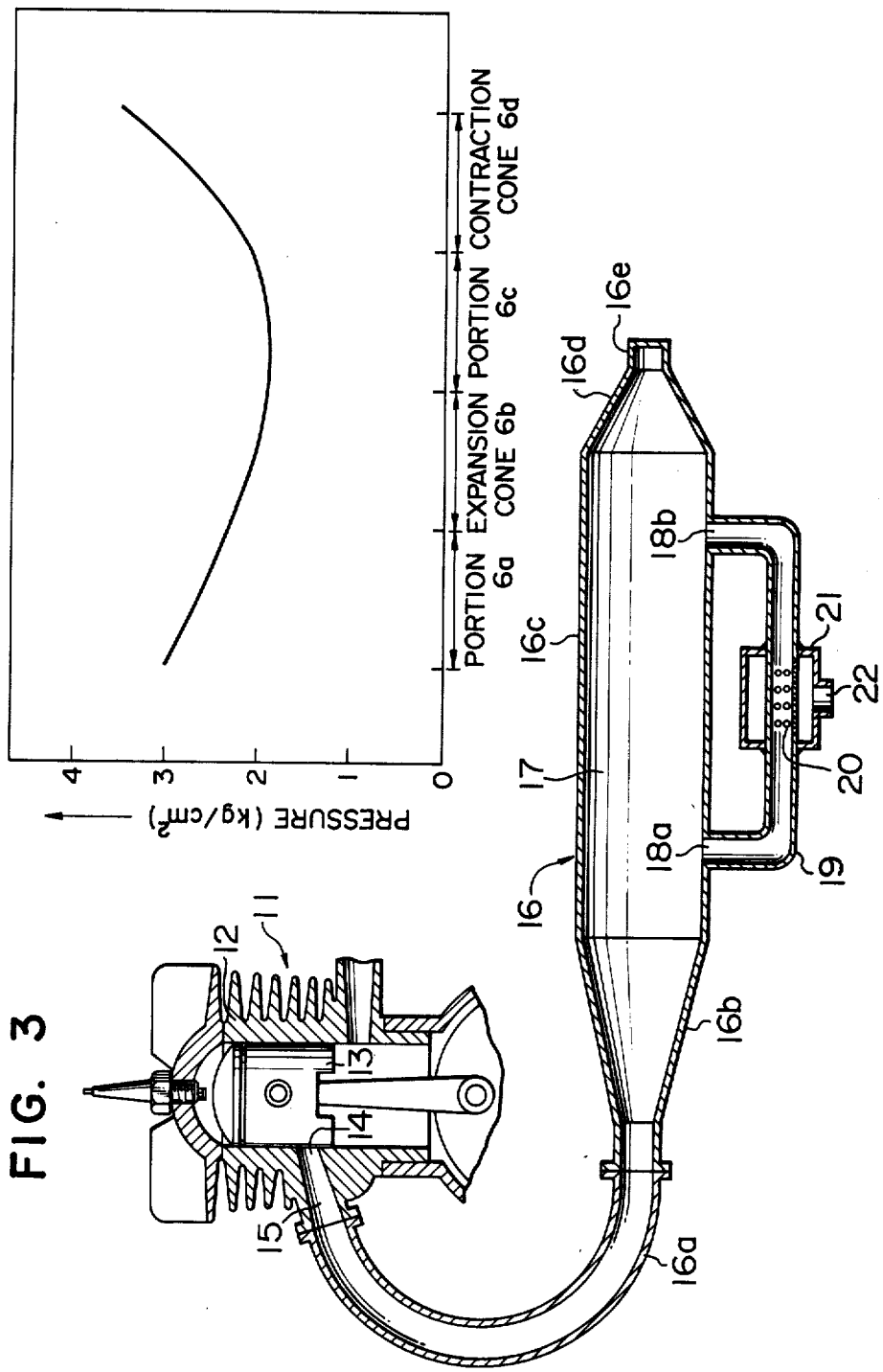

TWO-CYCLE ENGINE WAVE INTERFERENCE MUFFLER MEANS

The present invention relates to exhaust means for internal combustion engines and more particularly to engine exhaust means which is effective to attenuate noise producing pulsating pressure in engine exhaust gas. The terms "pulsating pressure" and acoustic wave" are used synonymously and interchangeable in this specification.

Conventionally, exhaust means for internal combustion engines includes an exhaust pipe having an open outlet end from which engine exhaust gas is discharged. Since engine combustion gas is cyclically discharged from an engine outlet port, it produces pulsating pressure in the exhaust pipe. The pulsating pressure thus produced propagates in the exhaust pipe toward the outlet end thereof and is finally discharged from the outlet end. A conventional engine exhaust pipe does not have any means or absorbing or attenuating the pulsating pressure so that it is discharged from the exhaust pipe substantially in the form as it was initially produced. Although the exhaust gas is introduced from the exhaust pipe into a muffler so that the noise producing pressure in the exhaust gas is substantially attenuated before it is discharged into atmosphere, it has been very difficult to suppress the noise level below an acceptable value unless a bulky muffler is used due to the fact that the pressure pulsation in the exhaust gas includes substantial low frequency components and that the maximum value of the pulsating pressure is high. Particularly, in a motor cycle in which only limited space is available for a muffler, the problem is serious.

The present invention has an object to eliminate the aforementioned problem in conventional engine exhaust means.

Another object of the present invention is to provide engine exhaust means in which engine exhaust gas is taken out at a position or positions where the maximum amplitude of the noise producing pulsating pressure in the exhaust gas is relatively low.

A further object of the present invention is to provide means for modifying engine exhaust gas in which noise producing pulsating pressure can be readily attenuated by a relatively small muffler.

According to the present invention, the above and other objects can be achieved by exhaust means for internal combustion engines which comprises exhaust pipe means having one end connected with exhaust port means of the engine, the other end of the exhaust pipe means being closed, said exhaust pipe means having a first portion of substantially uniform cross-sectional area which is adjacent to the exhaust port means of the engine, a second portion connected at one end with said first portion and having cross-sectional area increasing toward the other end thereof, and a third portion connected at one end with said second portion and closed at the other end, exhaust gas outlet port means being provided in said exhaust pipe means in said third portion and spaced apart from the closed end of the exhaust pipe means. According to the arrangement of the present invention, the engine-exhaust gas is allowed to expand in the exhaust pipe so that the maximum amplitude of the pulsating pressure in the exhaust gas can be decreased. Further, since the exhaust pipe means is closed at the terminal end, the pressure pulsation in the exhaust gas is reflected at the closed end. According to the investigation by the inventor, the maximum value of the pulsating pressure in the exhaust gas is lower in the intermediate portion of the exhaust pipe than in the both end portions thereof. In the arrangement of the present invention, the exhaust gas outlet port is provided at this intermediate portion of the exhaust pipe, particularly in said third portion so that the exhaust gas is discharged from the exhaust pipe with lower pressure level. The arrangement of the present invention is further effective to decrease low frequency components of noise in the exhaust gas. Thus, according to the arrangement of the present invention, it becomes possible to attenuate noise in the exhaust gas by a relatively small muffler.

When the invention is applied to exhaust means for two cycle engines, the total length of the exhaust pipe has an important effect on the performance of the engine since the pulsations reflected at the closed end propagates reversely in the exhaust pipe and reach the exhaust port. It has already been proposed to properly determine the length of the exhaust pipe so that a relatively low back pressure is applied at the exhaust port during the scavenging phase of the engine operation to facilitate initial scavenging of the exhaust gas while a relatively high back pressure is applied during compression stroke to prevent excessive amount of combustible mixture from escaping through the exhaust port. On the other hand, the distance between the exhaust gas outlet port means and the closed end of the exhaust pipe has an important effect on the amplitude of the pulsations at the outlet port means from what the gases exit. According to the arrangement of the present invention, the total length of the exhaust pipe can be determined as desired simply by increasing or decreasing the length of the first portion having the constant cross-sectional area without any effect on the nature of the pulsations taken out of the outlet port means.

The above and other objects and features of the present invention will become apparent from the following descriptions of preferred embodiments taking reference to the accompanying drawings in which:

FIG. 3 is a vertical sectional view of a two-cycle engine having an exhaust pipe in accordance with another embodiment of the present invention; and FIG. 4 is a diagram showing the change in maximum pressure along the length of the exhaust pipe.

Figure 1:
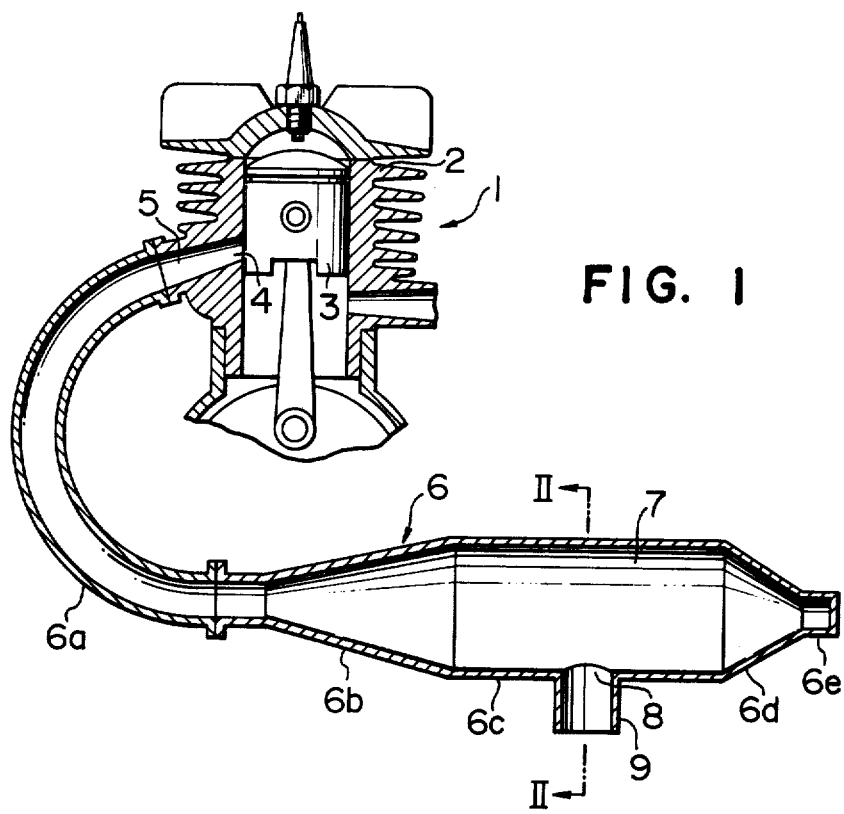
FIG. 1 is a vertical sectional view of a two-cycle engine equipped with an exhaust pipe made in accordance with the present invention.
Figure 2:
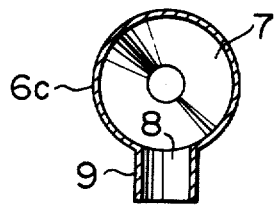
FIG. 2 is a sectional view taken along the line II—II in FIG. 1.

Referring now to the drawings, particularly to FIG. 1, there is shown a two-cycle engine 1 of conventional construction including a cylinder 2 and a piston 3 which reciprocates in the cylinder 2. As well known in the art, the cylinder is provided with scavenging ports (not shown) and an exhaust port 4 which leads to an exhaust passage 5. An exhaust pipe 6 is connected at one end with the exhaust passage 5 and has an upstream or first portion 6a of substantially uniform cross-sectional area. The uniform first portion 6a continues to an expansion cone or second portion 6b which gradually increase in cross-section toward the downstream side. In continuation with the expansion cone 6b, there is provided a cylindrical third portion 6c of substantially uniform cross-section which further continues to a contraction cone 6d. The terminal end of the contraction cone 6d is closed by a cup-shaped end portion 6e. Thus, in the exhaust pipe 6, there is defined an expansion chamber 7 by the expansion cone 6b, the cylindrical portion 6c and the contraction cone 6d. The exhaust pipe 6 is provided at the cylindrical portion 6c with an exhaust gas outlet port 8 which is connected with a downwardly directed outlet conduit 9.

In operation of the engine, combustion gas is cyclically discharged from the exhaust port 4 in the cylinder 2 into the exhaust pipe 6 and noise producing pulsating pressure propagates along the length of the exhaust pipe 6. The exhaust gas is allowed to expand in the chamber 7 so that the maximum amplitude of the pulsating pressure is substantially decreased. FIG. 4 shows the change in the maximum pressure along the length of the exhaust pipe 6. The pulsation in the exhaust gas is reflected at the contraction cone 6d and the closed end 6e and then proceeds in the reverse direction. Thus, it will be seen that the exhaust gas outlet port 8 is subjected to pulsating pressure from the engine exhaust port 4 and the pulsating pressure reflected by the portions 6d and 6e, whereby pulsation of higher frequency is taken out of the outlet port 8.

Since the maximum amplitude of the pulsation in the exhaust gas is substantially decreased in the expansion chamber 7, and higher frequencies leaving chamber 7 through the outlet port 8, the noise producing accoustic waves in the exhaust gas discharged from the exhaust pipe 6 through the outlet 8 can be readily attenuated by conventional muffler means of smaller dimension. For example, use may be made of a conventional muffler including noise absorbing materials such as glass fibers which are effective to attenuate the high frequency pulsations.

FIG. 3 shows another embodiment of the present invention. In FIG. 3, corresponding parts are shown by the same reference numerals plus ten. In this embodiment, the cylindrical portion 16c defining an expansion chamber 17 is provided with two axially spaced apart outlet ports 18a and 18b which are connected together by an external conduit 19 which is formed with perforations 20 at the intermediate portion thereof. The position of the perforations may be so determined that pulsations from the ports 18a and 18b reach these with 180° of phase difference. A housing 21 having an outlet opening 22 encompasses the perforated area of the conduit 19. In other respects, the arrangements of the embodiment are identical to those in the previous embodiment so that the details will not be described further.

In this embodiment, the length of the conduit 19 is so determined that the pulsations from the port 18a interfere with those from the port 18b at the area of the perforations 20 so that the pulsations can be substantially attenuated before they are discharged from the outlet port 22. In both embodiments, the outlet ports 8 and 22 may of course be connected with conventional muffler means for further attenuating the noise producing pulsation.

The invention has thus been shown and described with reference to specific embodiments but it should be noted that the invention is no way limited to the details of the illustrated structures and changes and modifications may be made without departing from the scope of the appended claims.

I claim:

1. Means to discharge and silence the exhaust from an internal combustion engine having one end connected with exhaust port means of the engine to receive the exhaust gases therefrom, the other end being closed, said means including a first portion of substantially constant cross-sectional area which extends from said first end, a second portion connected to and receiving the exhaust gases from said first portion and having a cross-sectional area which increases as the second portion extends away from the first portion, and third portion having a substantially uniform cross-sectional connected to and receiving the exhaust gases from said second portion, closure means closing the other end of said third portion, and exhaust gas outlet port means from said third portion spaced apart from the closure means and from the second portion, no part of the first portion overhanging the said exhaust gas outlet port means, said outlet port means comprising a plurality of axially spaced outlet ports which are connected together through conduit means having further opening means for exhaust of said gases.

2. Exhaust means according to claim 1 in which said closure means comprises a fourth portion have a cross-sectional area decreasing as it extends away from the third portion.

3. Exhaust means according to claim 1 in which said conduit means is encompassed at the area of the opening means by housing means having further exhaust gas outlet port means from the housing means.

4. Exhaust means according to claim 1 in which said conduit means has such a length that pulsations from the outlet post wear 3 interfere with each other at the area of the opening means so that they are attenuated.

5. Means to discharge and silence the exhaust from an internal combustion engine having one end connected with exhaust port means of the engine to receive the exhaust gases therefrom, the other end being closed, said means including a first portion of substantially constant cross-sectional area which extends from said first end, a second portion connected to and receiving the exhaust gases from said first portion and having a cross-sectional area which increases as the second portion extends away from the first portion, and a third portion having a substantially uniform cross-section connected to and receiving the exhaust gases from said second portion, close means closing the other end of said third portion, and exhaust gas outlet port means from said third portion spaced apart from the closure means and from the second portion, said outlet port means comprising a plurality of axially spaced outlet ports which are connected together through conduit means having further opening means.

6. Exhaust means according to claim 5 in which said conduit means is encompassed at the area of the opening means by housing means having further exhaust gas outlet port means from the housing means.

7. Exhaust means according to claim 5 in which said conduit means has such a length that pulsations from the outlet port means interfere with each other at the region of the opening means so that they are attenuated.

* * * * *